United States Patent [19]

Holmes et al.

[11] 3,916,947
[45] Nov. 4, 1975

[54] REFRIGERATION SYSTEM VALVED FITTING

[75] Inventors: Paul M. Holmes, Jackson; Douglas M. Brant, Mason; Thomas J. Swope, Jackson; Joseph F. Reinker, Jr., Parma, all of Mich.

[73] Assignee: Aeroquip Corporation, Jackson, Mich.

[22] Filed: Mar. 13, 1974

[21] Appl. No.: 450,584

[52] U.S. Cl. .................. 137/544; 285/64; 62/292; 137/360
[51] Int. Cl.² .......................................... E03B 7/07
[58] Field of Search ........ 62/77, 292, 299; 137/359, 137/360; 285/64

[56] References Cited
UNITED STATES PATENTS

| | | | |
|---|---|---|---|
| 2,138,503 | 11/1938 | O'Brien | 137/360 |
| 2,512,090 | 6/1950 | Cooper | 62/77 |
| 2,565,416 | 8/1951 | Wittlin et al. | 62/292 |
| 2,659,389 | 11/1953 | Harvey | 137/359 X |
| 2,910,086 | 10/1959 | Stewart | 137/356 |
| 3,229,710 | 1/1966 | Keller | 137/359 X |
| 3,785,163 | 1/1974 | Wagner | 62/292 X |

Primary Examiner—Henry T. Klinksiek
Attorney, Agent, or Firm—Beaman & Beaman

[57] ABSTRACT

A fitting for refrigeration systems, particularly suitable for attaching to the panel of a refrigeration component housing, such as a central air conditioning condenser unit, wherein the fitting comprises a plurality of stems such as a shutoff valve stem, a conduit fitting stem and a charging stem affixed to a tubular manifold wherein the stems extend in a common direction from the manifold such that the manifold may be mounted within the interior of a housing and the stems are exteriorly accessible when extending through panel openings. The stems are axially spaced upon the manifold to provide ease of access and wrench clearance, and the manifold may include a filter screen for filtering fluid flow therethrough. Additionally, the invention contemplates the use of an orifice plug within the fitting to control the rate of fluid flow through the fitting.

8 Claims, 10 Drawing Figures

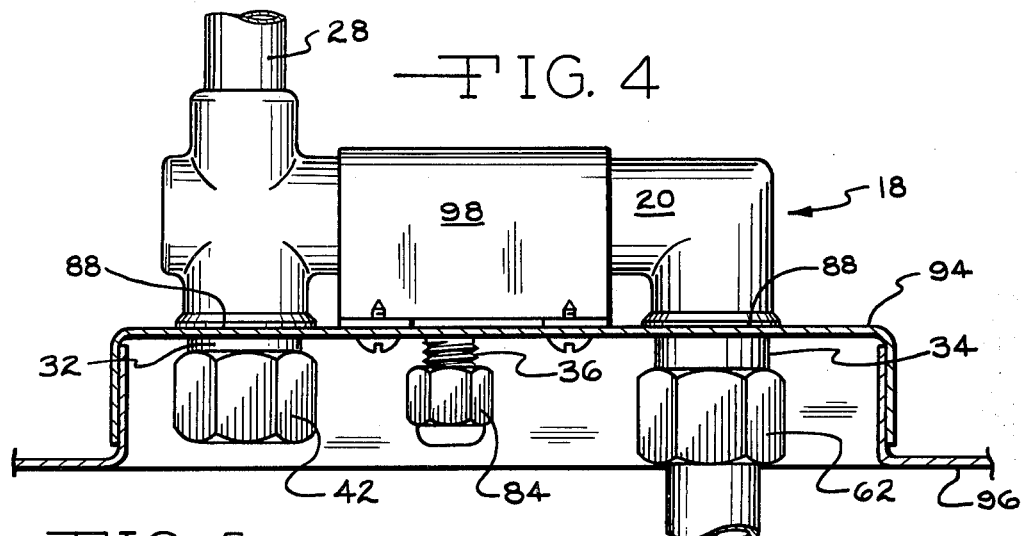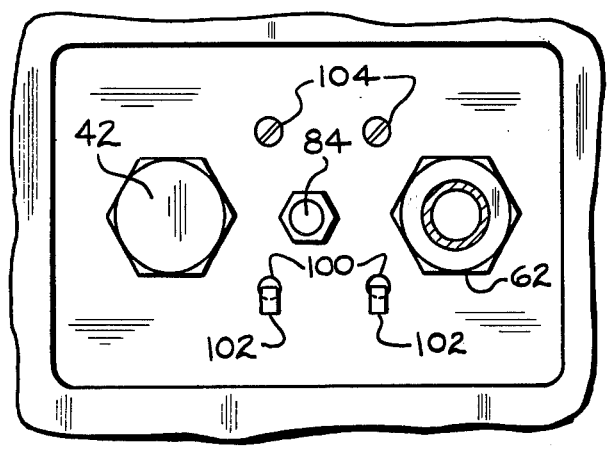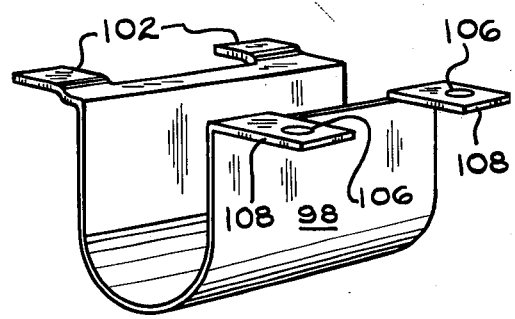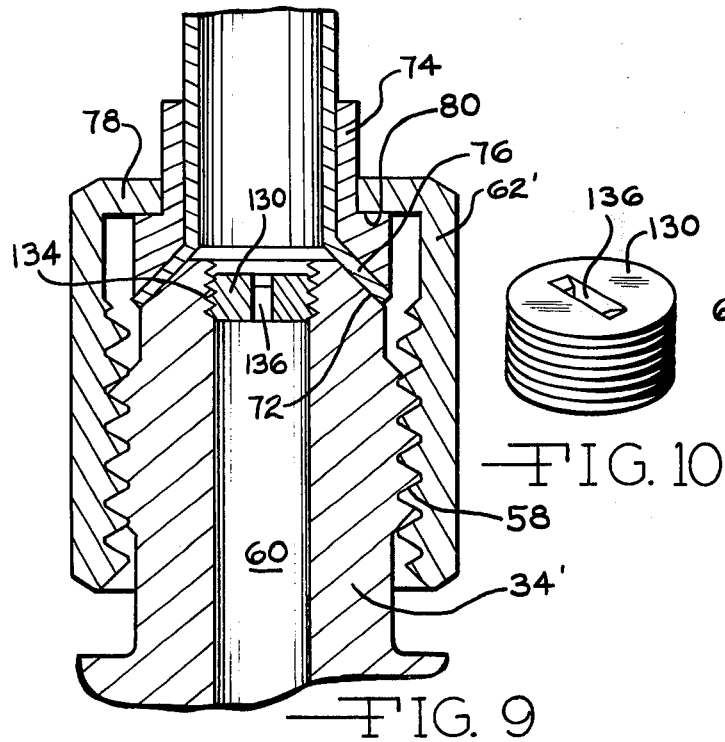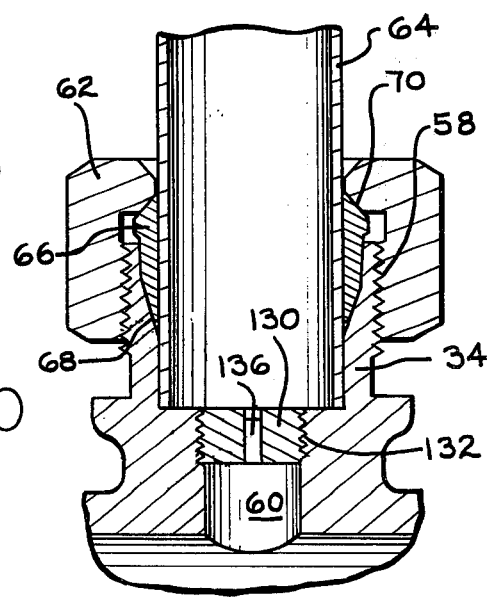

REFRIGERATION SYSTEM VALVED FITTING

BACKGROUND OF THE INVENTION

The invention pertains to refrigeration system valved fittings having a plurality of capped threaded stems extending from an elongated manifold.

Refrigeration systems, particularly central air conditioning units, commonly employ "base" valves in the suction line between the evaporator and compressor, and between the condenser and evaporator. These base valves usually constitute a single right angled fitting having a shutoff valve incorporated therein as well as inlet and outlet conduit fittings, and also may include a small auxiliary port to permit charging of the system with a refrigerant.

The base valves of air conditioning refrigeration systems are usually either mounted within the condenser unit housing, or exteriorly of the housing immediately adjacent thereto. Because of the right angled configuration of conventional base valves, and the orientation of the charging ports thereon, access to the base valves, and the fitting components mounted thereon, such as conduit coupling nuts and caps, is often difficult due to the available clearance. For instance, wrenches are necessary to tighten the conduit fitting compression nuts, as well as affix and remove the valve and charging port caps. As each of these threaded components may be angularly related in a different plane the planes of movement of the wrenches employed in tightening or unloosening the base valve threaded components are different, and because of the location of the base valve within the refrigeration system housing, or because of limited area between the refrigeration system housing and adjacent walls, considerable difficulty is often experienced in properly tightening the base valve threaded components, or servicing the system through the charging port.

Further, conventional base valve constructions are relatively expensive to machine, and are not readily suitable for machining by high speed production techniques.

SUMMARY OF THE INVENTION

It is an object of the invention to provide a refrigeration system "base" valve which is easily mounted to the panel of a refrigeration system housing, and wherein the ports and components of the valve are oriented in a common direction from the main valve body, or manifold, resulting in improved mounting characteristics.

Another object of the invention is to provide a refrigeration system valved fitting employing a manifold having threaded stems axially spaced on the manifold and extending in a common direction therefrom whereby the fitting may be mounted upon a panel and the stems are easily accessible and the threaded components, nuts and caps mounted thereon may be wrench operated by moving the wrench through a common plane of movement for all threaded components.

An additional object of the invention is to provide a refrigeration system valved fitting which is of economical construction, wherein the components thereof may be manufactured by high production machining techniques, wherein simple and inexpensive mounting of the fitting can be employed, and yet the mounting system is highly flexible and adaptable to various installations.

The fitting in accord with the invention includes an elongated tubular manifold constituting the primary fitting body. Three threaded stems radially extend from the manifold axially spaced thereon. One of the stems constitutes a shutoff valve receiving stem, another comprises a conduit fitting stem, and the third constitutes a charging stem through which the refrigeration system may be charged with refrigerant. The fitting may not necessarily incorporate the charging stem.

The fitting stems are each exteriorly threaded whereby threaded caps may be attached to the valve receiving and charging stems, and a compression nut may be attached to the conduit fitting stem. Fitting mounting surfaces related in a coplanar manner may be defined directly on the manifold, or concentrically defined on axially spaced stems, such as the valve receiving and conduit fitting stems.

The valve receiving stem, and the portion of the manifold in axial alignment thereto, is threaded to receive a shutoff valve, and the valve is operated by a wrench inserted into the valve through the end of the valve receiving stem. A conduit flow passage is defined in the manifold in axial alignment with the valve receiving item, and shutoff valve, and a valve seat disposed adjacent the flow passage cooperates with the shutoff valve whereby the valve may be selectively used to control fluid flow through the fitting.

A filter screen may be incorporated within the manifold passage intermediate the flow passage and the conduit fitting and charging stems for filtering the refrigerant flow through the manifold. Also, fluid flow through the fitting may be regulated very accurately by employing a threaded orifice plug, preferably located within the conduit fitting stem. Such an orifice plug may be incorporated into conduit fitting stems of either the compression or flanged type.

The mounting of the fitting upon refrigeration system housing may be by means of a jamb nut threaded upon a stem, such as the charging stem, or if the mounting surfaces are defined upon the manifold, threaded holes intersecting the mounting surfaces and screws may be employed. Additionally, it is anticipated that some mounting installations may be best served by using a sheet metal bracket circumscribing a portion of the fitting which is attached to the mounting panel and maintains the fitting mounting surfaces in engagement with the panel.

BRIEF DESCRIPTION OF THE DRAWINGS

The aforementioned objects, advantages and purposes of a refrigeration system valved fitting in accord with the invention will be understood from the following description and accompanying drawings wherein:

FIG. 4 is a top plan view of a further embodiment of fitting in accord with the invention using a sheet metal mounting bracket, FIG. 5 is an elevational view of the installation of FIG. 4 as taken from the bottom of FIG. 4, FIG. 6 is a perspective view of the sheet metal mounting bracket employed with the embodiment of FIG. 4, FIG. 8 is a detailed, enlarged, diametrical sectional view of a conduit fitting stem utilizing a compression fitting and orifice plug, FIG. 9 is a view similar to FIG. 8 illustrating a flanged type conduit fitting stem utilizing an orifice plug, and FIG. 10 is a perspective view of an orifice plug as used in the stems illustrated in FIGS. 8 and 9.

DESCRIPTION OF THE PREFERRED EMBODIMENTS

Figure 1:
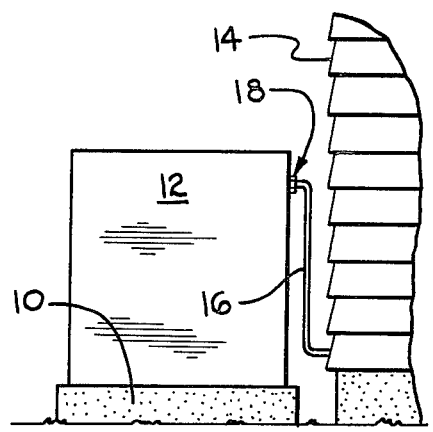
FIG. 1 is an elevational view of a typical central air conditioning condenser unit installation illustrating the type of clearance problem often existing.

FIG. 1 illustrates a typical exterior central air conditioning installation for domestic use wherein the clearance and space problems often encountered will be apparent. In a central air conditioning system for homes the compressor and condenser unit is usually mounted upon a cement pad 10 and is enclosed within a housing 12 located upon the pad. For several reasons, it is usually desirable to mount the housing 12 as close to the dwelling as possible. Esthetic reasons, minimizing interference with landscaping, zoning restrictions, and the like often dictate a minimum of clearance between the housing 12 and the wall 14 of the dwelling. Several conduits, one of which is illustrated at 16, connect the compressor and condenser unit to the evaporator system located within the dwelling heating and cooling distribution system. Such conduits include the illustrated suction line, electrical connections, and the liquid refrigerant tube, not shown. Because of the proximity between the housing 12 and the dwelling wall 14, limited clearance at the base valved fitting, as located at 18, FIG. 1, and the wall makes the tightening and removal of the threaded components of the base valve difficult, and with conventional base valve constructions considerable dexterity, and often special tools, are required to properly install conduits to the base valve, and operate the shutoff valve. Further, such limited clearance often makes use of the charging valve very difficult.

A refrigeration system valved fitting 18 in accord with the invention solves many of the problems existing with conventional base valves. The fitting of the invention includes an elongated tubular manifold 19, preferably of generally cylindrical construction having a wall 20 and ends 22 and 24.

Figure 7:
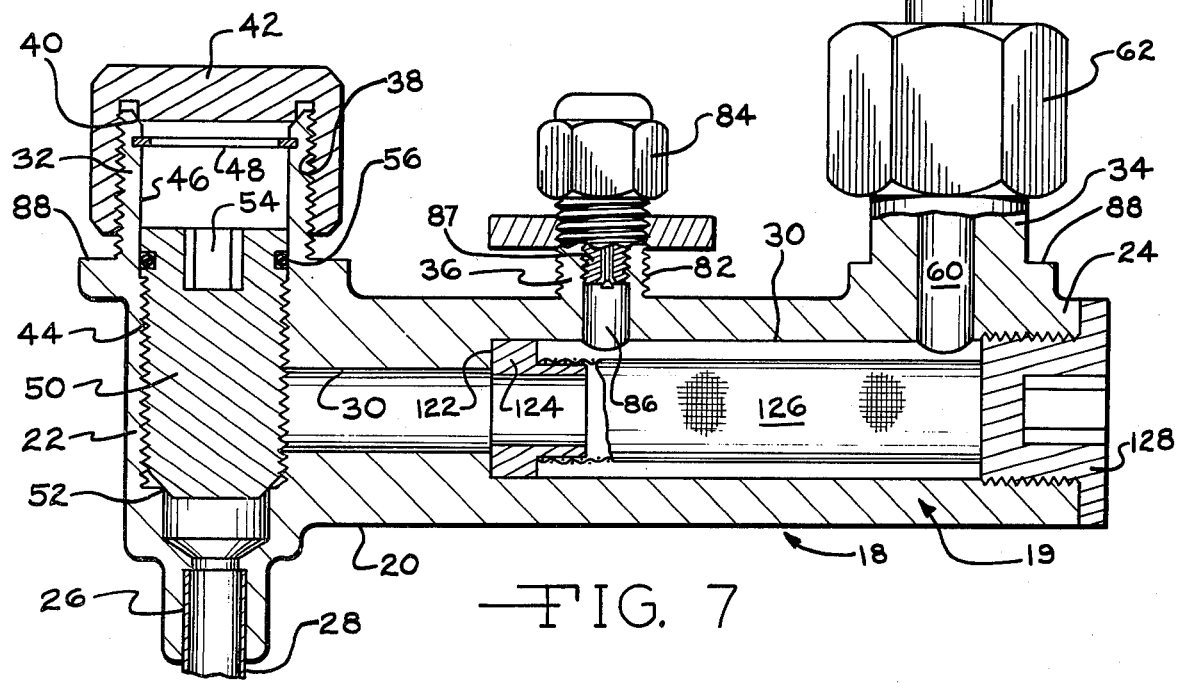
FIG. 7 is a sectional view of a valve fitting in accord with the invention utilizing a filter screen.

A flow passage 26, FIG. 7, is defined on the manifold 19 adjacent the end 22 having an axis radially disposed with respect to the longitudinal manifold passage axis. The flow passage 26 is cylindrically machined to receive a conduit 28 soldered thereto, FIG. 7, connecting the valved fitting to the refrigeration components, such as a compressor, within the housing.

In the illustrated embodiments three threaded stems are mounted upon the manifold wall 20, each stem has a longitudinal axis which intersects the axis of the manifold passage 30 at a right angle, and the axes of each of the stems are parallel and lie within the same plane. Also, as will be appreciated from the drawings, the stems extend in a common radial direction from the manifold 19.

The three illustrated stems comprise a shutoff valve stem 32 located adjacent the end region 22, a conduit fitting stem 34 located adjacent end 24, and a charging stem 36 located intermediate the stems 32 and 34.

The valve receiving stem 32 is exteriorly threaded at 38 and is provided with an open end 40. A threaded cap 42 is normally screwed upon the stem 32 and upon turning the cap down firmly upon the open end 40 the valve receiving stem 32 is sealed. The manifold 19 is internally threaded at 44, and a cylindrical wall 46 is formed within the stem 32. The stem is also provided with an annular groove for receiving the snap ring 48. A shutoff valve 50, FIG. 7, is mounted within the valve stem 32 and the threaded portion of the manifold, and is exteriorly threaded for cooperation with the manifold threads. Rotation of the valve 50 axially positions the valve for selective engagement with the annular valve seat 52 concentrically related to the flow passage 26, or a position removed from the valve seat to permit full fluid flow from the manifold passage 30 into the flow passage. Rotation of the valve 50 is through a hexagonal socket 54 whereby a hexagonal wrench may be inserted into the socket through the stem open end 40. The presence of the snap ring 48 prevents the valve from being completely removed from the stem 32 and an annular O-ring 56 mounted in the valve 50 and engaging the surface 46 seals the valve with respect to the stem.

The conduit fitting stem 34 is externally threaded at 58, see FIGS. 8 and 9, and is provided with an axial passage 60 communicating with the manifold passage 30. A compression nut 62 is threaded upon the stem 34 and the details of the construction of the stem depend on whether a compression bushing is used with the conduit 64, as in FIG. 8, or a flanged connection with the conduit is employed, as in FIG. 9. As apparent from FIG. 8, a stem 34 employing a compression bushing 66 is machined to include an internal tapered surface 68 for cooperation with the compression bushing. The nut 62 includes a shoulder 70 bearing upon the outer end of the bushing 66 for forcing the bushing into the tapered surface and thereby compressing the bushing against the conduit 64 to form a sealed connection.

If a flanged conduit connection is desired, as in FIG. 9, the exterior end of the stem 34' is machined in a conical manner at 72, and a ferrule 74 is inserted over the conduit 64 prior to forming the flange 76. The nut 62' includes a shoulder 78 bearing upon the ferrule shoulder 80 whereby tightening of the nut 62' will maintain the conduit flange 76 in a sealed relationship to the stem conical end 72.

The charging stem 36 is provided with exterior threads 82 and a sealing cap 84 is normally threaded thereon to seal the charging stem passage 86, which communicates with the manifold passage 30, FIG. 7. A check valve 87, FIG. 7, is normally mounted within the stem passage 86, and usually takes the form of a conventional tire stem valve wherein fluid may flow into the stem 36 during charging, but may not flow therefrom.

Figure 2:
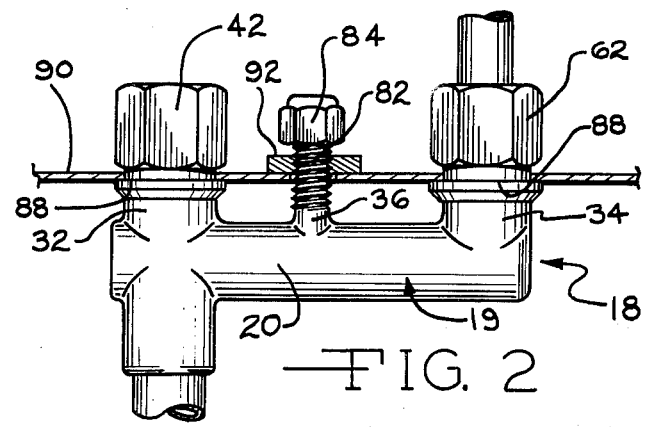
FIG. 2 is a top plan view of a valved fitting in accord with the invention using a jamb nut type mounting.

Various types of mounting means for the fitting may be utilized. In the embodiment of FIG. 2 the valve receiving stem 32 and the conduit fitting stem 34 are each provided with concentric annular mounting surfaces 88 radially located from the manifold wall 20, and in coplanar relationship. In FIG. 2 the refrigeration system component housing panel is illustrated at 90, and is provided with holes through which the stems 32, 34 and 36 extend. The diameter of the mounting surfaces 88 is greater than the diameter of the associated panel holes such that the surfaces will engage the interior side of the panel. A jamb nut 92 is threaded upon the threads 82 of the charging stem 36 and bears against the exterior surface of the panel 90 and tightening thereof firmly attaches the valved fitting 18 to the panel 90.

The type of mounting surface illustrated in the fitting of FIG. 2 may also be utilized when using a sheet metal mounting bracket of the type shown in FIGS. 4 through 6. With reference to these figures, the fitting 18 includes the mounting surfaces 88 defined upon the valve receiving stem 32 and the conduit fitting stem 36, and, in this embodiment, the fitting is illustrated as being mounted upon the recessed panel 94 recessed inwardly with respect to the housing outer panel 96. Holes are defined in the recessed panel 94 whereby the stems 32, 34 and 36 may extend therethrough and a sheet metal mounting bracket 98 of U-configuration passes about the manifold 19 for maintaining the surfaces 88 in engagement with the panel 94.

As will be apparent in FIG. 5, the panel 94 includes holes 100 for receiving the mounting bracket tangs 102, and screw receiving holes are defined in the panel for receiving the screws 104 which are threaded into holes 106 defined in the mounting bracket tabs 108. Of course, sheet metal nuts may be mounted upon the tabs 108, and sheet metal screws used to affix the bracket 98 to the panel 94.

Figure 3:
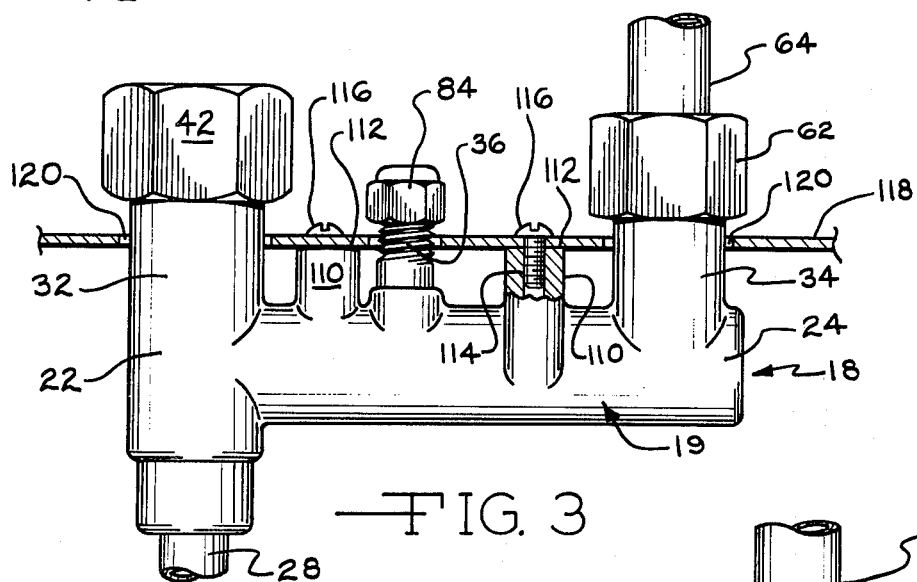
FIG. 3 is a top plan view of another embodiment of valve fitting in accord with the invention utilizing a screw type mounting.

Another variation in mounting means for the valved fitting 18 is illustrated in FIG. 3. In this embodiment the manifold wall 20 is provided with a pair of axially spaced radially extending bosses 110 each provided with coplanar mounting surface ends at 112. The bosses 110 are interiorly bored and threaded at 114 for receiving screws 116 which extend through the mounting panel 118. As illustrated in FIG. 3, openings 120 are formed in the panel 118 for receiving the stems 32, 34 and 36.

It is to be noted that the plane of mounting surfaces 88 or surfaces 112 is substantially perpendicular to the plane in which the axes of stems 32, 34 and 36 lie, and this relationship assures the most desirable fitting orientation to a mounting panel.

In the event that it is desired to filter the refrigerant flowing through the fitting 18 the fitting 30 may be provided with a shoulder 122, FIG. 7 against which bears the filter base 124. The filter base concentrically supports an annular filter screen 126 which is of sufficient axial length to align with both the conduit fitting stem 34 and the charging stem 36. The filter screen 126, at its right end, is engaged by threaded end cap 128 formed in the manifold end 24, and in this manner removal of the end cap 128 permits removal and cleaning or replacement of the filter screen. The presence of the filter screen insures that all fluid flowing through the stem 34 is filtered prior to passing through the flow passage 26, and likewise, refrigerant entering the charging stem 36 is also filtered before being introduced into the refrigeration system.

If it is desired to closely regulate the flow rate through the valved fitting 18, such flow regulation is best achieved by using an orifice plug 130, which may be readily located within the conduit fitting stem 34. In FIG. 8, the stem 34 is interiorly threaded at 132 for receiving the threaded plug 130 having a slotted orifice 136. The slotted configuration of the orifice permits the plug to be readily inserted or removed into the stem, and by varying the dimensions of the orifice the flow control thru the valved fitting may be regulated.

In the embodiment of FIG. 9, the stem 34' is internally threaded at 134 for receiving the threaded plug 130 which is identical to the plug illustrated in FIGS. 8 and 10.

It will be appreciated that by relating the stems 32, 34 and 36 in axial spaced relationship upon the manifold 19, and as the stems are parallel and extend from the manifold in a common direction, the mounting of the valved fitting 18 at the rear of the housing 12, assures that the planar movement of wrenches used to rotate the caps 42 and 84, and the nut 62, is substantially parallel to the housing rear panel, such as 90, 96 or 118 and the dwelling side wall 14, and thus rotation of the wrenches may be easily accomplished. The fitting in accord with the invention assures that access to the valve 50 is easily accomplished upon removal of the cap 42, and likewise, removal of the charging stem cap 84 provides easy access to the charging stem 36, even though the spacing between the housing 12 and the dwelling side wall 14 is limited. Additionally, as the stems may be machined upon high production screw machine equipment, and then brazed or otherwise affixed to the manifold wall, economical, low cost production techniques may be employed. Also, if it is desired to form the manifold and stems of the same piece of material, as illustrated in FIG. 7, known forging techniques can be used to produce the fitting at a reasonable cost.

It is appreciated that various modifications to the inventive concept may be apparent to those skilled in the art without departing from the spirit and scope thereof.

We claim:

1. A valved fitting for refrigeration systems characterized by ease of access thereto comprising, in combination, an elongated tubular manifold having an axis, an elongated wall and first and second ends, an elongated tubular internally threaded shutoff valve receiving stem mounted on said manifold in communication therewith having an axis radial to said manifold axis and an open end, a flow passage defined on said manifold selectively communicating therewith substantially radially disposed to said manifold axis and in axial alignment with said valve receiving stem, said valve receiving stem and flow passage located adjacent said first manifold end, a valve seat defined in said manifold adjacent said flow passage, a threaded valve threadedly received within said manifold in alignment with said stem and selectively engageable with said valve seat upon radial movement with respect to said manifold axis controlling flow between said manifold and flow passage, said valve being accessible through said open end for radial adjustment thereof with respect to said manifold axis, an elongated tubular conduit fitting stem mounted upon said manifold in communication therewith adjacent said second end having an axis radial to said manifold axis and in axial spaced relation to said valve receiving stem, said conduit fitting stem including conduit mounting means for mounting a conduit thereon in coaxial relationship therewith, the axes of said stems being parallel and coplanar whereby access to said valve and attachment of a conduit to said fitting are in a common radial direction and plane with respect to said manifold axis, and a mounting surface defined on said manifold.

2. In a valved fitting for refrigeration systems as in claim 1, a charging stem mounted on said manifold in communication therewith and axially spaced on said manifold from said valve receiving and said conduit fitting stems, said charging stem having a radial axis projecting from said manifold in the same plane and same radial direction as said valve receiving and conduit fitting stems.

3. A valved fitting for refrigeration systems characterized by ease of access thereto comprising, in combination, an elongated tubular manifold having an axis, an axial passage, an elongated wall and first and second ends, said first end being closed, said passage intersecting said second end, a removable end cap closing said passage at said second end, an elongated tubular shut-off valve receiving stem defined on said manifold wall adjacent said first end communicating with said passage and radially disposed to said manifold axis, said stem having an open outer end, a cylindrical sealing wall adjacent said open end and internally threaded adjacent said passage, a flow passage defined in said manifold selectively communicating therewith and in axial alignment with said valve receiving stem and on the opposite side of said axis, an annular valve seat defined in said manifold within said flow passage, a valve threadedly received within said manifold in alignment with said stem sealingly engaging said sealing wall and selectively engageable with said valve seat controlling flow between said manifold and flow passages, said valve being confined within said manifold and stem and accessible for adjustment through said stem open outer end, valve movement limiting means within said stem preventing inadvertent removal of said valve from said stem, an elongated conduit fitting stem defined on said manifold wall axially spaced thereon from said valve receiving stem adjacent said second end and communicating with said manifold passage and radially disposed to said manifold axis including conduit mounting means for mounting a conduit thereon in coaxial relationship therewith, a charging stem defined on said manifold wall axially spaced thereon intermediate said valve receiving and conduit fitting stems communicating with said manifold passage and radially disposed to said manifold axis, a check valve within said charging stem, said stems each having an axis and extending from said manifold wall in a common radial direction, said stem axes being substantially parallel and coplanar, and at least one flat mounting surface defined on said fitting perpendicular to the plane in which said stem axes lie and facing in the radial direction in which said stems extend from said manifold wall.

4. In a valved fitting for refrigeration systems as in claim 3, exterior threads defined on said charging stem, a mounting surface defined on each of said valve receiving and conduit fitting stems, and a nut received on said charging stem.

5. In a valved fitting for refrigeration systems as in claim 3, a removable orificed plug mounted within said conduit fitting stem controlling fluid flow therethrough.

6. In a valved fitting for refrigeration systems as in claim 3, a filter screen within said manifold passage intermediate said conduit fitting stem and said flow passage filtering fluid flowing through said manifold, said removable end cap providing access to said filter screen.

7. In a valved fitting for refrigeration systems as in claim 3, threads exteriorly defined on said valve receiving stem, and a threaded cap threaded upon said valve receiving stem enclosing said stem open outer end, said cap requiring removal for access to said valve, and engageable sealing means defined on said valve receiving stem and cap sealing said stem upon tightening of said cap thereon.

8. In a valved fitting for refrigeration systems as in claim 7, threads exteriorly defined on said conduit fitting stem, an annular compression nut threaded upon said fitting stem, and an annular conduit compression member mounted on said fitting stem for compression by said nut.

* * * * *